(12) United States Patent
Manglapus et al.

(10) Patent No.: US 6,219,151 B1
(45) Date of Patent: *Apr. 17, 2001

(54) NETWORK PRINTING SYSTEM

(75) Inventors: Levi Lloyd Garcia Manglapus, Sunland; Igor Uchenik, Tarzana; Maxim Ariel Sorkin; Mark Patrick Murphy, both of Canoga Park; Susan Zia, Valencia; Alistair Michael Egan, Oxnard, all of CA (US)

(73) Assignee: Hitachi Koki Imaging Solutions, Inc., Simi Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/138,962

(22) Filed: Aug. 24, 1998

(51) Int. Cl.[7] ................................................ G06F 15/00
(52) U.S. Cl. ........................................ 358/1.15; 358/1.13
(58) Field of Search ............................... 358/1.15, 1.13, 358/1.1, 407, 468, 1.14, 1.11, 1.6, 1.9, 1.16, 1.17, 1.18, 434, 435, 436, 437, 438, 439; 709/203, 222, 218, 245, 246, 250, 249, 305; 710/3–5, 8–9, 11, 14–19, 21, 26, 62, 64, 72; 395/500.44, 500.45, 500.46, 500.47, 500.48, 500.49

(56) References Cited

U.S. PATENT DOCUMENTS

| | | | |
|---|---|---|---|
| 4,751,630 | 6/1988 | Kelley, Jr. et al. | 364/200 |
| 5,040,142 | 8/1991 | Mori et al. | 364/900 |
| 5,050,098 | 9/1991 | Brown, III et al. | 364/519 |
| 5,075,874 | 12/1991 | Steeves et al. | 395/112 |
| 5,079,628 | 1/1992 | Tomikawa | 358/86 |
| 5,220,674 | * 6/1993 | Morgan et al. | 358/1.11 |
| 5,295,246 | 3/1994 | Bischoff et al. | 395/250 |
| 5,371,837 | * 12/1994 | Kimber et al. | 358/1.15 |
| 5,533,174 | 7/1996 | Flowers, Jr. et al. | 395/114 |
| 5,619,649 | 4/1997 | Kovnat et al. | 358/1.1 |
| 5,638,497 | 6/1997 | Kimber et al. | 395/114 |
| 5,692,111 | 11/1997 | Marbry et al. | 395/114 |
| 5,727,135 | 3/1998 | Webb et al. | 395/113 |
| 5,761,433 | 6/1998 | Billings | 395/200.61 |
| 5,778,183 | 7/1998 | Filion et al. | 395/200.53 |
| 5,898,823 | 4/1999 | Sorkin et al. | 395/114 |
| 5,903,716 | * 5/1999 | Kimber et al. | 358/1.15 |

* cited by examiner

*Primary Examiner*—Dov Popovici
(74) *Attorney, Agent, or Firm*—Pillsbury Winthrop LLP (57) ABSTRACT

A printing network including at least one user workstation and a printer is described. The user workstation transmits print jobs with image controller commands having data which is representative of a network address of the user workstation. An image controller at the printer receiving the print job executes the image controller commands in the print jobs to extract the network address of the user workstation. Processes in the printer store the extracted network address of the user workstation in association with data representative of the print job. The printer transmits messages to the user workstation concerning the status of the print job using the network address extracted from the print job.

26 Claims, 6 Drawing Sheets

NETWORK PRINTING SYSTEM

BACKGROUND

1. Field of the Invention

The present invention relates to electronic networks having a plurality of client or agent terminals or systems, and more particularly to networks having one or more printers for receiving print jobs from computers or other printer users within the network.

2. Related Art

While different types of protocols are possible for status monitoring and configuration of devices within an electronic network, one of the most commonly used protocols is the Simple Network Management Protocol (SNMP). The SNMP defines asynchronous messages or "traps" to be transmitted to a management application. In a typical electronic network, a plurality of clients in the form of computer workstations are coupled to the network together with one or more printers and an intermediate spooler. In order to receive traps from a printer, a computer workstation typically must first "register" with the printer by communicating a network address associated with the computer workstation to the printer. This enables the printer to directly address trap messages to the registered computer workstation.

The client computer workstation transmits "print jobs" or "job requests" (the terms "print job" and "job request" are hereinafter used interchangeably) to the spooler which then stores spooled jobs in queues in the form of a scheduling list of print jobs to be done. The spooler then routes the job request to the printer upon releasing the job request from the queue. In a "push" printing system, the job requests typically include information requesting a printing service from a printer, information which identifies a particular document to be printed and print data which includes data representative of an image to be printed as the document. Upon receiving the job request in push printing system, the printer prints an image from the image data transmitted in the job request. In a "pull" printing system, the job requests typically include information requesting a printing service from a printer, information which identifies a particular document to be printed and, instead of print data, an address of a network memory location where image data is stored. Upon receiving the job request in a pull printing system, the printer retrieves the print data stored at the network memory location to print the document.

Upon receiving a job request and any associated print data, the printer typically parses this information at a network controller to extract the print data and pass job identification information to a document manager process. The network controller then typically forwards the extracted print data to an image controller. The image controller then typically provides control signals to a print engine based upon the print data to transfer an image onto a medium. Such a system is described in U.S. Pat. No. 5,778,183 assigned to Xerox Corporation.

The SNMP allows the printer to transmit messages or "traps" to all or select workstations in the network. Such traps may be used to transmit, for example, printer status information or status information relating to specific print jobs. A "general" trap is typically used to broadcast a message to all workstations to indicate that, for example, the printer is jammed, out of paper, or low on toner, etc. "Document specific" traps are typically sent to specific workstations indicating the status of a particular job originating at the workstation. Such document specific traps may indicate, for example, that a particular job has started or that a particular job has completed.

To send a document specific trap to the workstation which initiated the job (i.e., document created at the workstation), the network controller in the printer typically associates the particular print job with the network address of the originating workstation. The particular word processing program and printer driver on the workstation does not have access to the network address of the particular physical printers to which the documents are ultimately sent. The word processing program and printer driver merely have information which may identify the printer server associated with the physical printer.

A separate "monitor" task executing on the workstation typically retrieves the network address of the particular physical printer to which a document may be sent. To establish direct communication through the SNMP with a particular printer, the monitor task typically transmits a request to a task executing on the printer to provide document specific traps to the monitor task. Such a request from a monitor task must, therefore, include information identifying the network address of the workstation and information identifying the specific document which is to be transmitted from the workstation to the file server, and then placed on the printer's queue. When the printer receives the document job to be processed from the queue, the printer associates the document with the network address of the workstation, and sends document specific traps to the monitor task using the SNMP.

Unfortunately, implementation of a monitor task for retrieving the network address of the printer and then transmitting a message to a printer with the network address of the user workstation is a cumbersome procedure for establishing direct communication between a user workstation and a printer which receives print jobs originating at the user workstation. Accordingly, there is a need for developing more efficient and reliable system of establishing direct communication between a user workstation and a printer.

SUMMARY

An object of an embodiment of the present invention is to provide a network printing system in which a printer efficiently and reliably transmits messages to user workstations.

Another object of an embodiment of the present invention to provide an efficient, simple and reliable method for communicating the network address of user workstation in a printing network to a printer in the same network.

Another object of an embodiment of the present invention to provide a system and method for providing to a user workstation in a printing network timely information regarding the status of a print job originating at the user workstation.

Another object of an embodiment of the present invention is to provide an efficient and reliable system for transmitting a network address of a network printer to a user workstation.

It is yet another object of an embodiment of the present invention to provide an efficient system and method for transmitting simple network management protocol (SNMP) traps from a printer in a network printing system to a user workstation in the network printing system.

Briefly, embodiments of the present invention are directed to a printing network including at least one user workstation and a printer. The user workstation is preferably capable of transmitting print jobs with image controller commands having data which is representative of a network address of the user workstation. An image controller at the printer receiving the print job preferably interprets the image controller commands to extract the network address of the user workstation. This enables the printer to transmit messages to the user workstation based upon the extracted network address.

By transmitting the network address of the user workstation in an image controller command of a print job, the printer which services the print job can obtain the network address of the user workstation without receiving additional messages from a monitor task at the user workstation or from an intermediary print server. The printer may then associate the extracted network address of the user workstation with the particular print job transmitting the network address. When events affecting the status of the print job occur, the printer may readily report such status to the associated user workstation by transmitting a document specific SNMP trap to the user workstation based upon the extracted network address.

BRIEF DESCRIPTION OF THE DRAWINGS

A detailed description of the invention will be made with reference to the accompanying drawings, in which.

DETAILED DESCRIPTION

Methods and systems according to the invention provide for transmission of the network address of a user workstation (or other client terminal) within a network to a printer by generating and transmitting a job request to the printer by way of the server or other spooling system within the network. Print data associated with the job request originating at the user workstation includes commands which are interpretable at an image controller in the printer. At least one of these commands preferably includes information representative of a network address of the originating user workstation or another user workstation. Upon receiving the job request from the spooler, a network controller at the printer passes the job request to the image controller. The image controller preferably parses the print data associated with the job request to extract the image controller commands. The image controller interprets the extracted image controller commands, including those having data representative of the network address of the user workstation, to recover the network address of a user workstation. The printer may then transmit messages addressed to the user workstation using data embedded in the image controller commands. These messages may be transmitted according to the SNMP as document specific traps to report the status of a print job.

Figure 1:
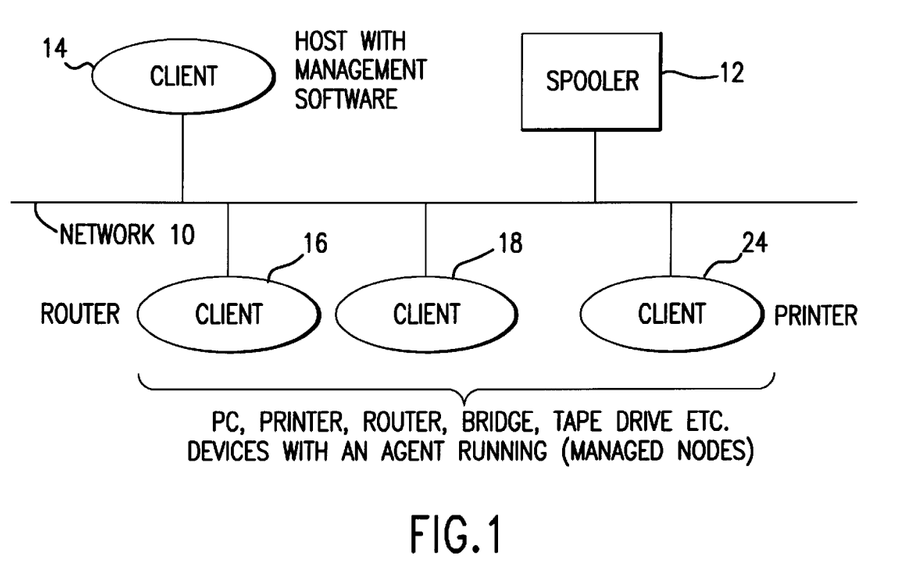
FIG. 1 is a block diagram of an electronic network which may employ method and system according to an embodiment of the present invention.

FIG. 1 shows an electronic network 10 of the type which may employ a method and a system according to an embodiment of the present invention. The network 10 of FIG. 1 preferably implements a Simple Network Management Protocol (SNMP) because of its common usage in networks of this type. However, it should be understood that other communication protocols can be used in accordance with the invention.

The network 10 includes a spooler 12 and a plurality of client terminals 14, 16, 18 and 24. The client terminals 14, 16, 18 and 24 may include systems such as a personal computer (PC), a printer, a router, a bridge, a tape drive, and the like. Where one of the client terminals 14, 16, 18 and 24 comprises a computer (e.g., a user workstation) and another one of the client terminals comprises a printer, then as described hereafter, the computer typically transmits job requests to the printer by way of the spooler 12.

Figure 2:
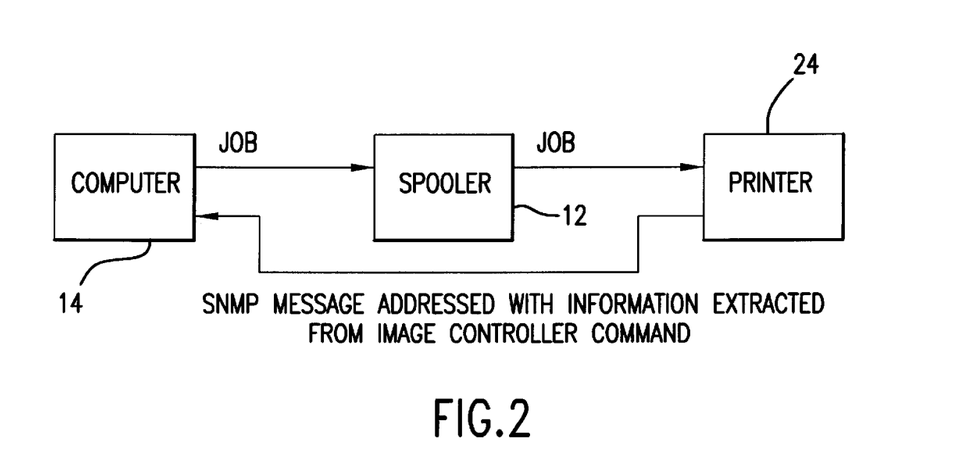
FIG. 2 is a block diagram representation of a portion of the network of FIG. 1, showing the manner in which print job requests from a sending client are routed through a spooler to a receiving client terminal such as a printer.

FIG. 2 depicts a portion of the network 10 which includes the client terminal 14, the spooler 12 and the client terminal 24. In the example of FIG. 2, the client terminal 24 is a printer and the client terminal 14 is a user workstation capable of generating and transmitting job requests to the printer 24 by way of the spooler 12. To initiate the printing of a document, the user workstation 14 generates and transmits a job request to the spooler 12. The network address of the spooler 12 is known to the user workstation 14 so that the job request is transmitted directly to the spooler 12. Transmission of the job request to the spooler 12 utilizes a spool queue in which a schedule list is made up of jobs to be performed. The spooler 12 further processes the job request, transmits the job request to the printer 24 and releases the job request from the spool queue.

In accordance with embodiments of the present invention, the printer 24 acknowledges receipt of the job request by transmitting an acknowledgment to the user workstation 14. The job request transmitted by the user workstation 14 is associated with print data having data representative of the network address of the user workstation 14. In a push printing network, the print data is preferably received from the spooler 12 as part of the job request. In a pull printing network, the print data is preferably retrieved from a network memory location. The data representative of the network address of the user workstation enables the printer 24 to identify the job request as coming from the user workstation 14, and send the acknowledgment to the network address of the user workstation 14. Where the network 10 employs the SNMP, the acknowledgment preferably takes the form of a trap in which the address of the printer 24 may be included.

FIG. 2 shows that communication from the user workstation 14 to the printer 24 typically takes the form of a transmission of a job request to the spooler 12, followed by a transmission from the spooler 12 to the printer 24 when the job request is released from the queue at the spooler 12. To receive status information from the printer 24 regarding the job request (e.g., job complete, how many copies printed, paper jam, etc.), the printer 24 may transmit a document specific SNMP trap to the user workstation 14. To transmit such an SNMP trap to the user workstation 14, a process executing in the printer 24 preferably addresses the trap directly to user workstation 14. This requires knowledge of the network address of the user workstation 14.

Embodiments of the present invention are therefore directed to imparting information representative of the network address of the user workstation 14 (or any other user workstation in the printing network) to the printer 24 to enable the printer 24 to transmit document specific SNMP traps to the user workstation 14 (or any other user workstation in the printing network). Such information is transmitted in a job request originating at the user workstation 14. As discussed below, processes executing at the printer 24 extract the network address of an intended destination of SNMP traps, and associate the extracted network address with the job request from which the network address was extracted. When monitoring processes executing at the printer 24 detect an event which affects or is related to the status of the job request, the printer 24 may transmit a document specific SNMP trap reporting the event using the extracted network address. The extracted network address may be associated with the user workstation 14 which initiated the job request or a network address of some other addressable location on the network. This facilitates the transmission of status information related to the job request to either the originating user workstation 14 or some other remote user workstation on the network.

Figure 3:
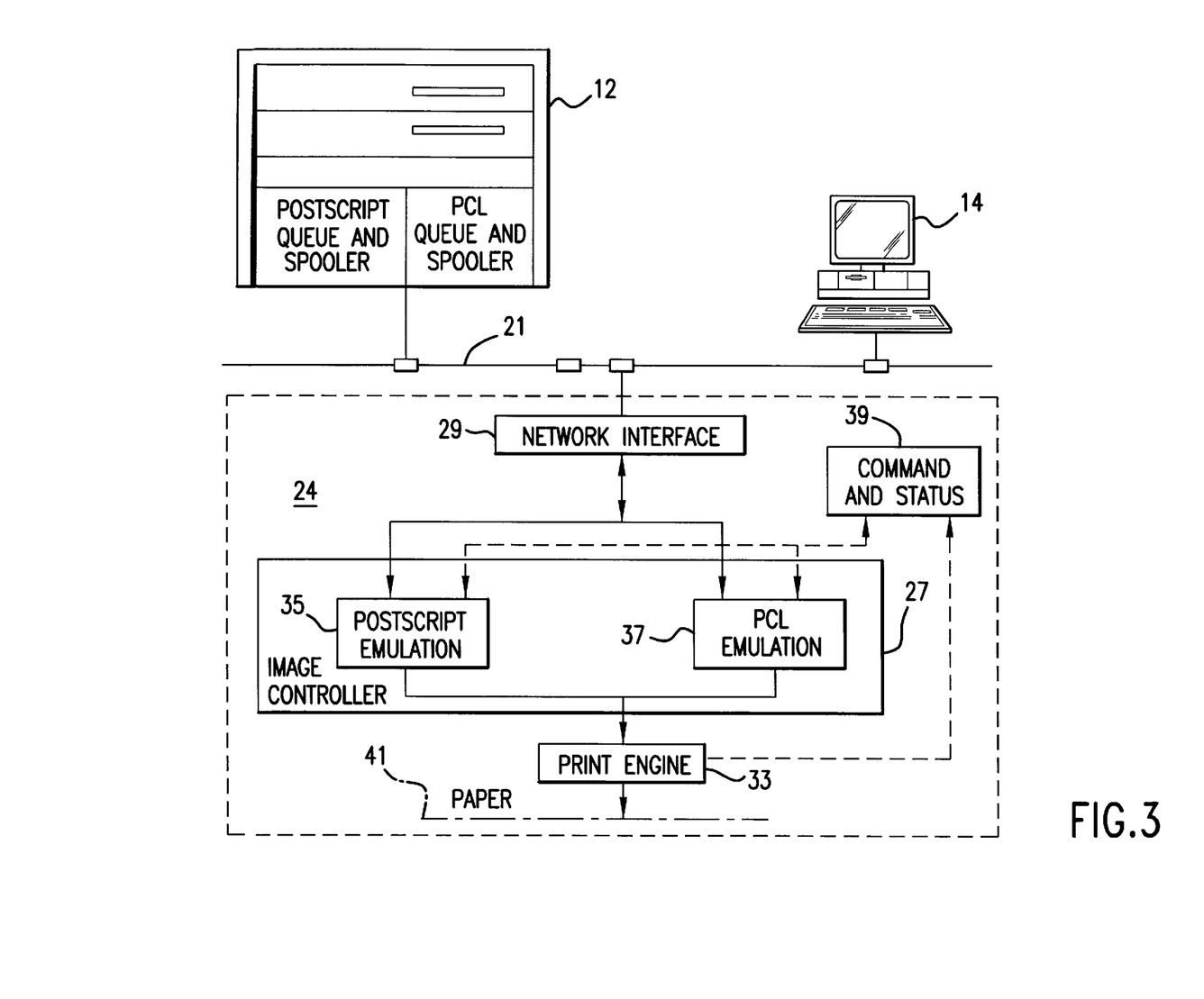
FIG. 3 illustrates processes in a printer and spooler of an embodiment of the network of FIG. 2.

FIG. 3 is a block diagram of an embodiment of the printer network shown in FIG. 1 with the further representation of an internal architecture of the printer 24. A network interface or network controller 29 couples the printer 24 to the network communications link 21. An image controller 27 provides control signals to a print engine 33 based upon data transmitted in print jobs.

The network controller 29 receives and transmits data packets to and from the spooler 12 and the user workstation 14. Data packets received from the spooler 12 may include, for example, data representative of a print job. Data packets transmitted to the user workstation 14 may include, for example, data representative of a trap according to the SNMP. In an push printing network embodiment, the network controller 29 may receive a print job from the spooler 12 in the form of several data packets which are reassembled to form the complete print job including all of the print data. The complete print job is then preferably passed to the image controller 27 for further processing.

In a pull printing network embodiment, the network controller 29 may receive one or more data packets from the spooler 12 which are reassembled to form a print job which includes information representative of a network memory address of the print data. The network controller 29 may then transmit one or more data packets to request retrieval of the print data from the network memory address, and receive data packets having the print data in response to the request. The network controller 29 may then reassemble the retrieved packetized print data and combine the reassembled print data with the other information received from the spooler 12 to form the complete print job. The complete print job is then preferably passed to the image controller 27 for further processing.

The image controller section 27 includes a PostScript emulation circuit 35 and a PCL emulation circuit 37. The emulation circuits 35 and 37 function, generally, to interpret print data and provide control signals to a print engine 33. The emulation circuit 35 interprets image controller commands according to a syntax of a Page Description Language (PDL) compatible with PostScript (trademark) and Adobe (trademark) type printers, and the emulation circuit 37 interprets image controller commands according to a syntax of a PDL compatible with Hewlett-Packard (trademark) type printers. Other embodiments may have emulation circuits for interpreting image controller commands in a printer independent language such as the Printer Job Language (PJL).

Thus, the image controller 27 can interpret commands in a specific syntax as provided in a printer language. This is different from systems which merely parse a data structure to extract data. Such parsing systems may, for example, count bytes in a byte string until bytes having the desired information is reached. The parsing system may then merely extract the remaining bytes in the byte string as the desired data. With an interpreting system according to an embodiment of the present invention, however, a data structure is searched for specific data which is recognized as a command according to a syntax or command library (e.g., of a printer language). The recognized command is then executed according to the syntax.

The command and status circuit 39 and the emulation circuits 35 and 37 exchange control signals to enable, for example, fault monitoring functions and the like. The print engine 33 may be, for example, a 30 ppm (page per minute) print engine. Print engine control signals from the emulator circuits 35 and 37 control the print engine 33 to print on a medium such as paper 41.

The emulation circuits 35 and 37 interpret image controller commands. Such commands typically include, for example, data representative of character settings, character sizes and other document formatting commands expressed according to the syntax of the printer language. For push printing systems, the image controller commands are inserted into a print data field of a print job received from the spooler 12. For pull printing systems, the image controller commands are inserted into print data retrieved from a network memory location.

According to an embodiment of the present invention, the emulation circuits 35 and 37 are modified to interpret additional commands which include data representative of the network address of the user workstation which creates and transmits the job to the spooler 12. Such commands preferably also include requests for updates on the status of the associated print job. Such request may be, for example, an indication of when the job has completed, how many copies of a particular job have been printed when multiple copies are requested in the print job, an indication that paper is low in the paper feeder compartment of the printer, toner is low, etc.

In an embodiment in a push printing network, the network interface 29 receives a print job with print data (having image controller commands inserted therein). The network interface 29 passes the received print job to the image controller section 27 intact, preferably without parsing the print job. The image controller section 27 then preferably parses the print job to extract the inserted image controller commands. In an embodiment in a pull printing network, the network interface 29 passes the received print job to the image controller section 27 and the image controller section 27 initiates a retrieval of the print data associated with the print job. The image controller section 27 then parses the retrieved print data to extract the image controller commands.

The proper emulation circuit within the image controller section then interprets the extracted image controller commands according to the syntax of the printer language. Upon interpreting such a command which indicates the network address of the user workstation 14 (or other location in the network for receiving status information) and status request information, the image controller 27 transmits this information to the command and status circuit 39 to associate the network address of the user workstation 14 (or other location in the network for receiving status information), the job request, and particular status information requested by the image controller commands. When the command and status circuit 39 detects an event which requires a status update message to be sent to the user workstation 14 (or other location in the network for receiving status information) regarding the print job request, the command and status circuit 39 preferably initiates the transmission of a document specific trap from the network interface 29 directed to the user workstation 14 based upon the network address extracted by the image controller 27. In this manner, the user workstation 14 obtains status information directly from the printer 24 without having first transmitted a message from a monitor task identifying the particular job request as originating from the user workstation 14, etc.

Figure 4:
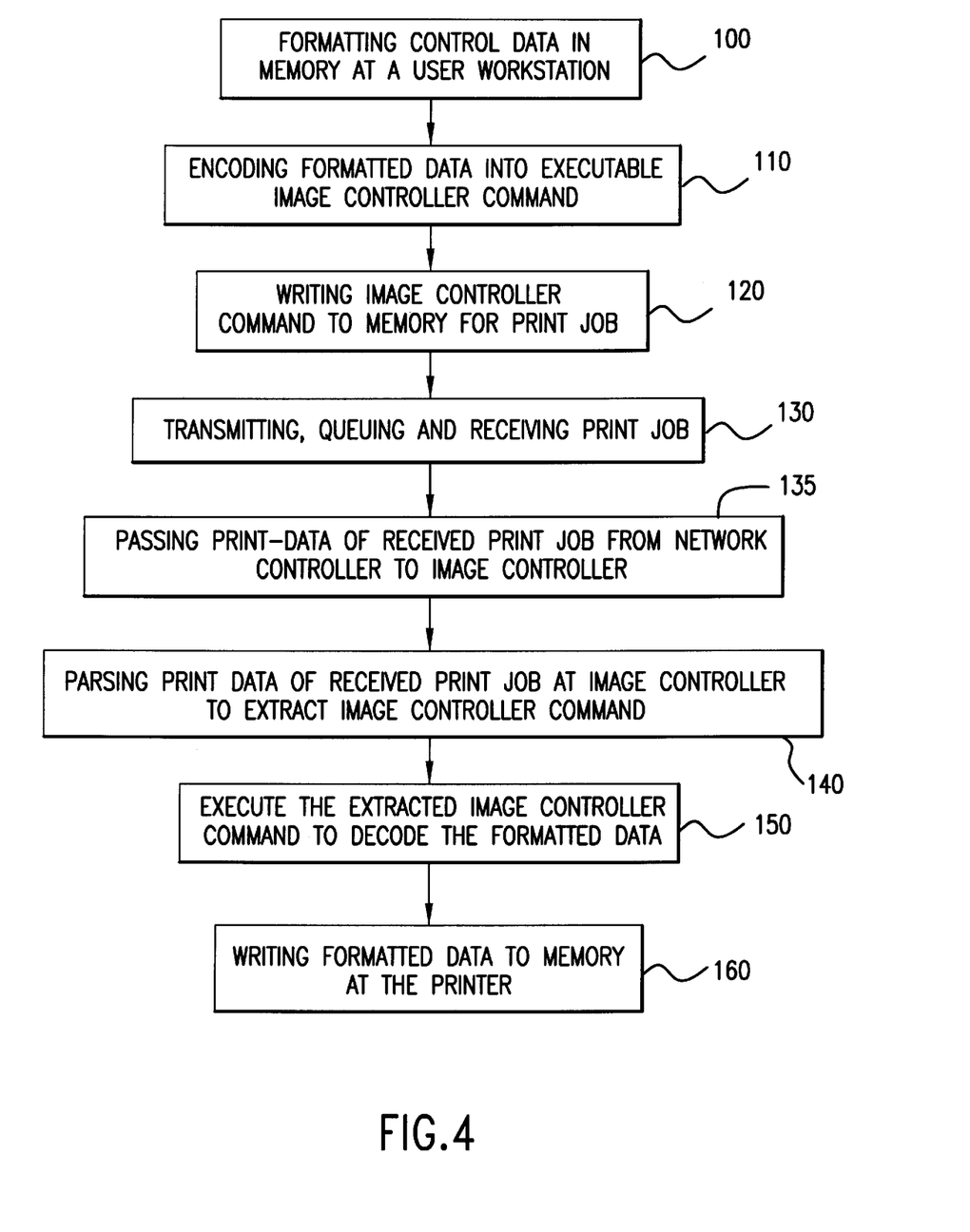
FIG. 4 is a flow diagram illustrating processes executing at a workstation and an image controller of a printer to communicate the network address of the workstation to the printer.

FIG. 4 shows a flow diagram which illustrates how control data, including the network address of the user workstation 14 (or other location in the network for receiving status information), for example, is transmitted from the user workstation 14 to a printer. Steps 100, 110 and 120 are preferably performed at a printer driver executing on the user workstation 14. Steps 135, 140, 150 and 160 are preferably performed by routines executing at the printer receiving a print job. Step 130 corresponds with the process of transmitting a formatted print job from the originating user workstation 14, queuing the print job at a print server, and receiving the print job at a physical printer upon releasing the print job from the associated queue at the printer server.

At step 100, control data is formatted in a memory at the user workstation 14. This control data may include, for example, the network address of the user workstation 14 (or other location in the network for receiving status information) and other control data such as requests for status information from the printer for a particular print job request. The formatted data is then encoded into an interpretable image controller command at step 110. Such a command may be a PJL command such as "SET JOBATTR." Such a command is preferably implemented in a manner to facilitate the objectives of the present invention. According to another embodiment, the interpretable image controller command is a new command added to the PJL library. Such a new command may permit the encoding of large amounts of information which may not be possible with a single SET JOBATTR command. The image controller command is then written to a memory location associated with the print job in a normal fashion at step 120. Sample source code for implementing steps 100, 110 and 120 is provided in Appendix A.

At step 135, the network controller passes the received print job to the image controller through a bus connecting the image controller and the network controller. In an embodiment in a push printing network, the image data of the received print job is preferably transmitted from a spooler to the printer as part of the received print job. In an embodiment in a pull printing network, the image controller preferably initiates a retrieval of the print data from a network memory location indicated by the received print job.

The image controller preferably parses the print data of the received print job to extract image controller command at step 140. At step 150, the image controller interprets the extracted image controller command to decode the formatted data which was encoded at step 110. At step 160, the image controller preferably writes the decoded data to a memory location at the printer in a format which corresponds with the control data as formatted at step 100. An example of source code for implementing step 150 is provided in Appendix B.

In one embodiment, the image controller initiates a process at the network controller to initiate a trap to the originating user workstation. Here, the image controller retrieves portions of the stored data extracted from the image controller command, including the network address of the user workstation which originated the print job, and transmits a message to the network controller on the bus connecting the network controller and the image controller. This message preferably instructs the network controller to execute a process to generate a trap directed to the user workstation. Such a trap preferably transmits the network address of the printer and print job identification information to initiate direct communication between the printer and the user workstation. An example of source code for the process at the network for initiating such a trap is provided in Appendix C.

Other embodiments are directed to inserting multiple image controller commands with information representative of a network address into a single document at step 120. Multiple image controller commands may be identical (a first at the beginning of the document and a second at the end of the document, for example) to ensure that the encoded information is transmitted to an image controller at the destination printer. Multiple image controller commands may also allow for the transmission of traps to more than one user workstation by encoding different network addresses in different image controller commands.

The insertion of multiple image controller commands in a document may effect requests for status information which is time dependent or context dependent. Examples of placement of multiple image controller commands for time dependent status information may include, for example, the insertion of image controller commands at specific locations in the document to report the completion of a specific page in the document. Here, an image controller command may be inserted in the print data at the bottom of the specific page. Thus, upon interpreting the command, the image controller can initiate the transmission of a trap to one or more locations on the network.

Examples of placement of multiple image controller commands for context dependent status information may include, for example, the insertion of image controller commands at specific locations in the document to report the printing of a specific font or character type. Here, an image controller command may be inserted in the print data at the beginning or end of a portion of text which is printed in a certain font or character type. This may be implemented by, for example, inserting an image controller command following a specific PDL command for a status request indicating that the specific PDL command has been processed. Thus, upon interpreting the command, the image controller can initiate the transmission of a trap to one or more locations on the network to report that this text portion is being or has been processed or printed.

The insertion of multiple image controller commands may also facilitate job accounting functions. For example, image controller commands having data representative of a network address of an accounting server or workstation may be inserted at the end of every page or every ten pages, etc., in a document. When the image controller interprets such a command, the image controller may initiate an SNMP trap to the accounting server or workstation to report that an additional page or number of pages have been printed.

The insertion of multiple image controller commands may also initiate the release of print data stored in a memory location at the printer to printed on the printer. Such print data may have been scanned into the memory from a scanning station at the printer or received from a facsimile transmission. The printer associates the stored print data with an identifier which may be transmitted to a process at a user workstation. The process at the user workstation may then transmit a print job with multiple image controller commands, a first image controller command to have the stored print data released for printing at the print engine and a second image controller command requesting an indication that the stored print data was printed. The second image controller command may have data representative of the network address of the user workstation or some other host on the network. The image controller can then send document specific SNMP traps to either the user workstation or the other host using the network address data.

Figure 5:
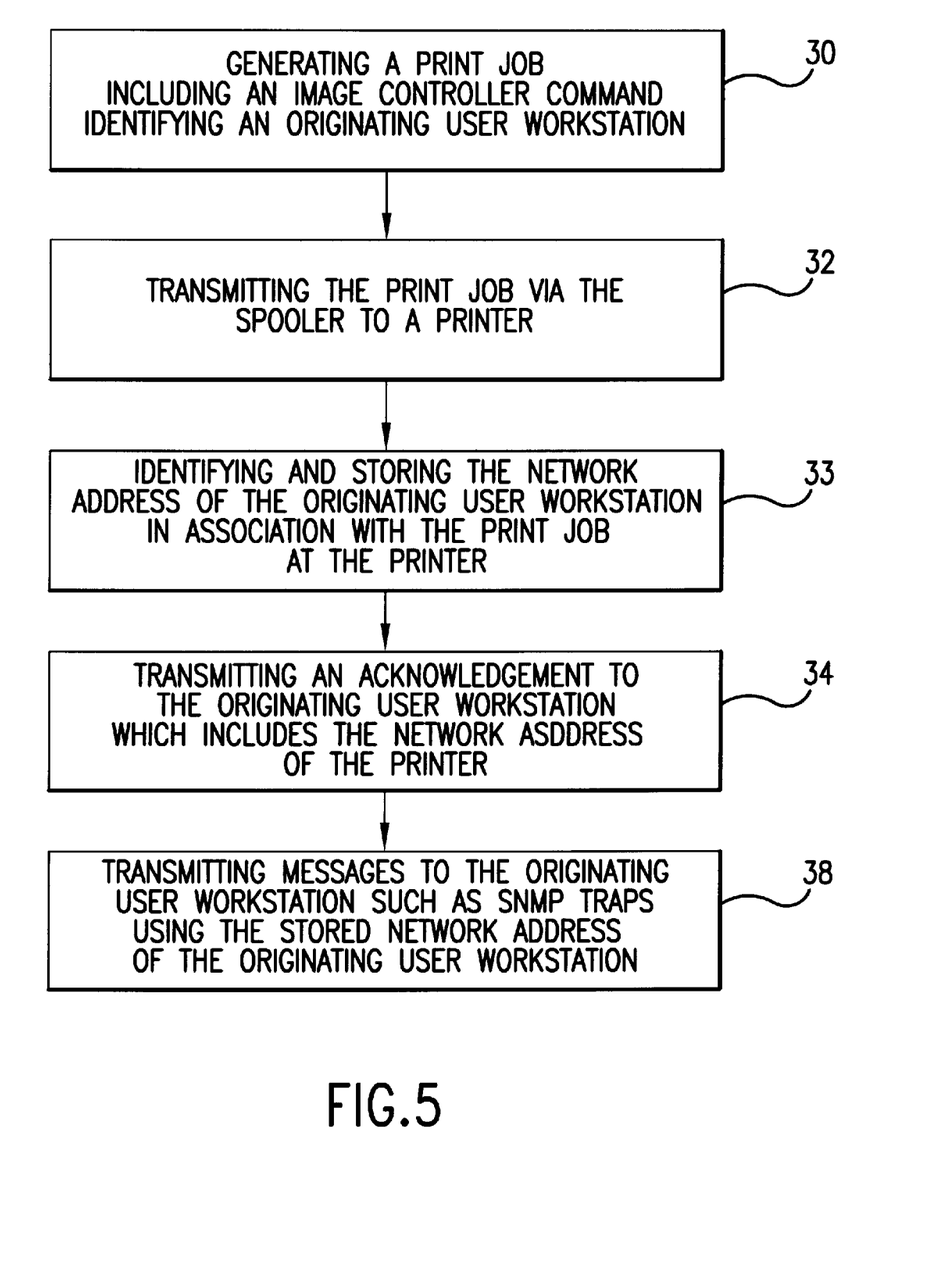
FIG. 5 is a block diagram illustrating the successive steps of a method of extracting the network address of a user workstation from an image controller command in accordance with an embodiment of the invention.

FIG. 5 shows the successive steps in a preferred method according to an embodiment of the present invention. In a first step 30, a print job is generated by the sending client such as the user workstation 14. Print data associated with the print job includes image controller commands which identify the network address of user workstation 14 (or other location in the network for receiving status information). In a second step 32, the print job is transmitted via the spooler 12 to the printer 24 in the manner previously described. In a third step 33, the printer 24 extracts and stores the network address of the user workstation 14 (or other location in the network for receiving status information) in association with the print job. In a fourth step 34, the printer 24 responds to receipt of the print job from the spooler 12 by transmitting an acknowledgment to the user workstation 14 (or other location in the network for receiving status information) based upon the extracted network address. The acknowledgment preferably includes the network address of the printer 24. As described hereafter, the acknowledgment may comprise an SNMP trap in the form of a string of bytes, certain ones of which identify the network address of the printer 24. Thereafter, and in accordance with a fifth step 38 of FIG. 5, the printer 24 may use the network address of the user workstation 14 (stored in association with the print job) for transmitting document specific SNMP traps to the user workstation 14. These traps may include, for example, information reporting events occurring at the printer 24 affecting the status of the print job.

Figure 6:
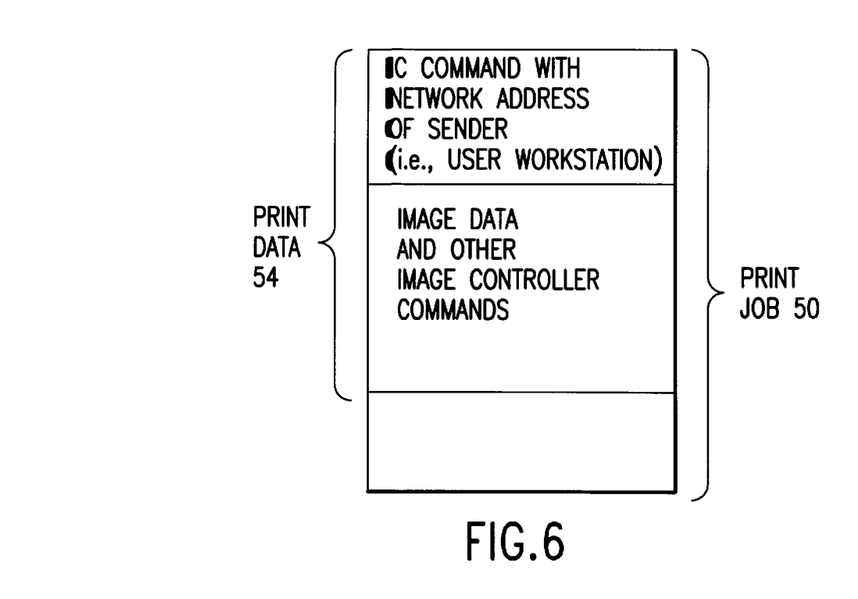
FIG. 6 is a representation of a print job which is generated and transmitted by a user workstation in accordance with an embodiment of the present invention.

FIG. 6 depicts the format of a typical print job 50 in accordance with a push network printing embodiment of the present invention. The print job 50 has a data structure which includes a print data field 54. The print data field 54 includes raw imaging data interleaved with commands to be executed by the image controller process executing at the printer 24. In a pull network printing embodiment, the image controller separately obtains the print data field following receipt of the print job 50.

Figure 7:
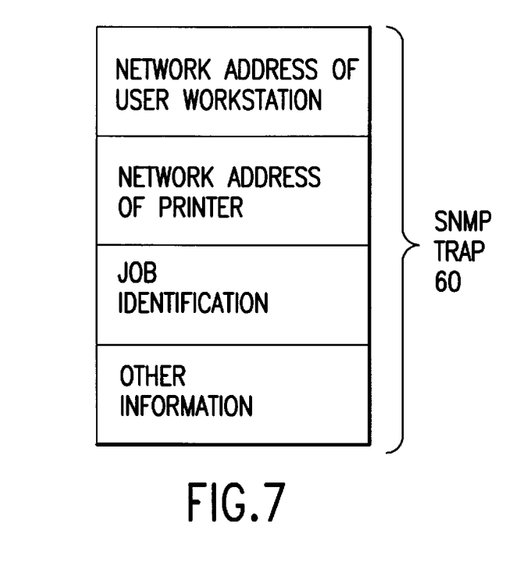
FIG. 7 is a representation of a trap generated and transmitted by a printer to the user workstation to report the status of the print job shown in FIG. 5.

The printer 24 preferably acknowledges receipt of the print job 50 by transmitting an acknowledgment to the user workstation 14. The acknowledgment is provided in the form of an SNMP trap 60 as shown in FIG. 7. As shown in FIG. 7, the SNMP trap 60 includes the network address of the printer 24, together with data identifying the print job and other information such as print job status information. The user workstation 14 detects and stores the network address of the printer 24 contained in the SNMP trap 60.

Figure 8:
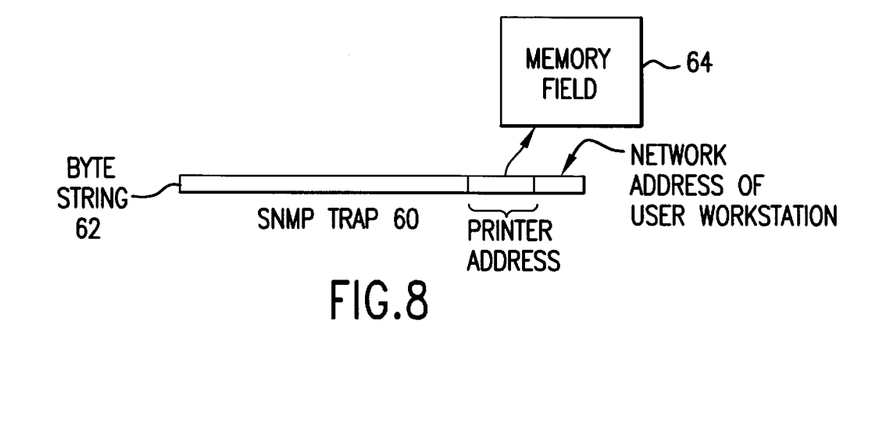
FIG. 8 depicts the acknowledgment trap of FIG. 6 in the form of a byte string, and showing the manner in which a portion thereof is stripped therefrom and stored in a memory field as the network address of the printer.

In FIG. 8, the SNMP trap 60 is shown as comprising a byte string 62. The byte string 62 is typically two hundred or more bytes in length. Moreover, it is known that the printer address begins at a particular byte location along the string 62. Consequently, the user workstation 14 detects those bytes within the string 62 which identify the printer address, and stores such bytes in a memory field 64. Thereafter, the user workstation 14 retrieves the network address of the printer 24 each time the user workstation 14 sends a message to the printer 24.

As described above, the user workstation 14 constructs print jobs which include image controller commands with information representative of the network address of the user workstation 14 (or other location in the network for receiving status information). These image controller commands, according to an embodiment, also include requests for notification of certain events occurring at the printer 24 in connection with the print job in which the image controller commands are embedded. Such a notification preferably takes the form of a document specific SNMP trap. The events reported to the user workstation 14 (or other location in the network for receiving status information) may include, for example, completion of print job, the number of pages printed, low toner, paper out or paper jam, etc.

Figure 9:
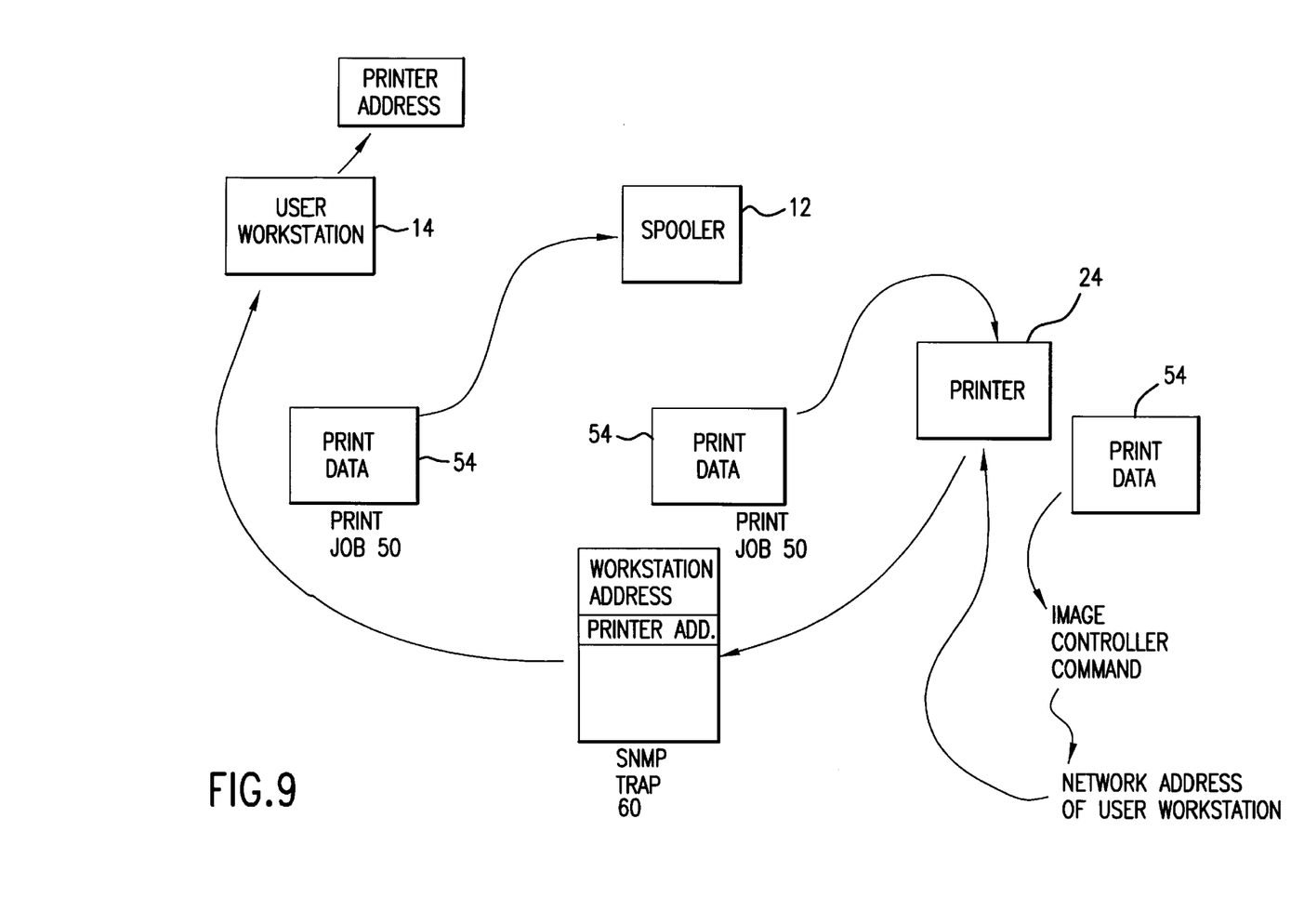
FIG. 9 illustrates the process of transmitting the network address of a user workstation to a printer and transmitting the network address of the printer to the user workstation in response.

Aspects of the method and system in accordance with an embodiment of the present invention in a push printing network are shown in greater detail in the block diagram of FIG. 9. As shown in FIG. 9, the user workstation 14 begins by generating the print job 50 including image controller commands having data representative of the network address of the user workstation 14 (or other location in the network for receiving status information). The print job 50 is transmitted to the spooler 12, and then by the spooler 12 to the printer 24. The image controller in the printer 24 executes the image controller commands in the print data 54 to extract the network address of the user workstation 14 (or other location in the network for receiving status information). The printer 24 stores the extracted network address of the user workstation in a memory in association with the print job 50 and, alternatively, status request information which is also extracted from the image controller commands. Thereafter, the printer 24 can transmit document specific traps to the user workstation 14 to report status information regarding the print job 50.

The printer may also send an acknowledgment trap 60 to the user workstation which includes the network address of the printer 24. As described in connection with FIG. 6, the user workstation 14 detects the network address of the printer 24 in accordance with the appropriate positions within the byte string 62 of the trap 60, and stores the network address of the printer 24 in the memory field 64 of the computer 14. Thereafter, the printer address may be used to achieve direct access of the printer 24 by the computer 14, when needed. In other embodiments, other addressable elements in the network which receive traps may also store the network address of the printer 24 to have direct access to the printer 24.

While the invention has been particularly shown and described with reference to preferred embodiments thereof, it will be understood by those skilled in the art that various changes in form and details may be made therein without departing from the spirit and scope of the invention.

What is claimed is:

1. In a printing network including one or more user workstations and a printer, the printer having an image controller, the network being capable of transmitting print jobs originating at a user workstation to the printer and transmitting messages from the printer to the user workstation, the print jobs including data representative of commands according to a syntax which are interpretable by the image controller, performing a method of:

at the user workstation, inserting at least one command into a print job, the at least one command being interpretable by a printer language emulation circuit at the image controller, the at least one command including data representative of a network address of the user workstation;

receiving the print job at the printer;

interpreting the inserted at least one command at the emulation circuit to extract the network address of the user workstation; and transmitting a message from the printer to the user workstation based upon the extracted network address of the user workstation.

2. The method of claim 1, the method further comprising:

following the step of inserting the at least one command into the print job, transmitting the print job to a print server;

maintaining the print job in a queue at the print server;

releasing the print job from the queue; and transmitting the released print job to the printer.

3. The method of claim 1, the method further comprising transmitting the message from the printer to the user workstation to report status information regarding the print job.

4. The method of claim 1, wherein the network is capable of transmitting the messages from the printer to the user workstation according to a simple network management protocol (SNMP), the method further including transmitting the message from the printer to the user workstation as an SNMP trap.

5. The method of claim 1, the method further including generating the at least one command in the syntax according to a printer language which includes at least one of a Page Description Language and a Printer Job Language.

6. A network printing system, the system comprising:

at least one user workstation for generating a print job, the print job including data representative of an image and image controller commands according to a syntax;

a printer, the printer including an image controller, coupled to the at least one user workstation by a network, the network being capable of transmitting the print job to the printer and transmitting messages from the printer to the user workstation, wherein the user workstation executes a process for inserting data into the print job which is representative of at least one command which is interpretable by a printer language emulation circuit at the image controller according to the syntax, the at least one inserted command including data representative of a network address of the user workstation, and wherein the printer includes logic for transmitting a message to the user workstation based upon the network address of the user workstation extracted from an interpretation of the at least one inserted command at the emulation circuit.

7. The network printing system of claim 6, the network printing system further including a print server for receiving a transmission of data representative of the print job, the print server including:

a memory for maintaining the received print job in a queue;

logic for releasing the print job from the queue; and circuitry for transmitting data representative of the released print job to the printer.

8. The network printing system of claim 6, wherein the printer further includes logic for transmitting the message from the printer to the user workstation to report status information regarding the print job.

9. The network printing system of claim 6, wherein the network is capable of transmitting the messages from the printer to the user workstation according to a simple network management protocol (SNMP), and wherein the network further includes circuitry for transmitting the message from the printer to the user workstation as an SNMP trap.

10. The network printing system of claim 6, the network printing system further including logic for generating the at least one command according to a printer language which includes at least one of Page Description Language and a Printer Job Language.

11. An image controller adaptable to a network printer for providing control information to a print engine, the image controller comprising:

a print engine interface;

a printer language emulation circuit having logic for interpreting first image controller commands inserted into a print job file, the print job file including image data and data representative of the first image controller commands according to a syntax, for providing control signals to the print engine based upon the image data and the first image controller commands, and logic for interpreting second image controller commands inserted into the print job file, the second image controller commands including data representative of a network address of a user workstation which generated the print job file according to the syntax, wherein the logic for interpreting the second image controller commands extracts the network address of the user workstation.

12. The image controller of claim 11, wherein the second image controller commands further includes data representative of a request to process print data stored in a memory location associated with the printer and the logic for interpreting the second image controller commands extracts the request to process the print data stored in the memory location from the second image controller commands.

13. The image controller of claim 11, wherein the second image controller commands further include data representative of a request to send a status message to an accounting host indicating that a quantity of media has been interpreted by the image controller, and wherein the logic for interpreting the second image controller commands extracts the request to send the status message from the second image controller commands.

14. The image controller of claim 11, wherein the second image controller commands further include data representative of a second network address other than the network address, and wherein the logic for interpreting the second image controller commands extracts the second network address from the second image controller commands.

15. The image controller of claim 11, wherein the first and second image controller commands are encoded in a printer language including at least one of Page Description Language and a Printer Job Language.

16. A computer workstation including a network connection for transmitting data representative of a print job, the print job including image data and data representative of commands according to a syntax which are interpretable by an image controller at a network printer, the computer workstation comprising:

logic for creating the print job, the print job including data representative of an image which is capable of being interpreted by a printer language emulation circuit of the image controller at the network printer; and logic for inserting commands interpretable by the emulation circuit into the print job, the inserted commands including data representative of a network address of the computer workstation.

17. The computer workstation of claim 16, wherein the inserted commands further include data representative of a request to process print data stored in a memory location associated with a network.

18. The computer workstation of claim 16, wherein the inserted commands further include data representative of a request to send a status message to an accounting host indicating that a quantity of media has been interpreted by the image controller.

19. The computer workstation of claim 16, wherein the inserted commands further include data representative of a network address other than the network address of the computer workstation.

20. The computer workstation of claim 16, wherein the inserted commands are encoded in a printer language including at least one of Page Description Language and a Printer Job Language.

21. In a printing network including one or more user workstations and a printer, the printer having an image controller, the network being capable of transmitting print jobs originating at a user workstation to the printer and transmitting messages from the printer to the user workstation, the print jobs including data representative of commands according to a syntax which are interpretable by the image controller, performing a method of:

at the user workstation, inserting a first image controller command into a print job at a first location in the print job, the first image command controller being interpretable by a printer language emulation circuit of the image controller, the first image controller command including data representative of a network address of a location on the network for receiving messages from the printer, and inserting a second image controller command into the print job at a second location in the print job, the second image controller command being interpretable by the emulation circuit, the second image controller command including data representative of a request for a status message to be transmitted to the network address;

receiving the print job at the printer;

interpreting the second image controller command at the emulation circuit to extract the request for transmission of the status message; and transmitting a message from the printer to the network address upon interpreting the second image controller command.

22. The method of claim 21, the method further including transmitting the message to the network address to indicate that the print job has been processed up to the second location in the print job.

23. The method of claim 21, the method further including:

inserting the first image controller command as having data representative of a request to process print data stored in a memory location at the printer; and inserting the second image controller command into the print job including data representative of the request for the status message to the network address indicating that printing of the stored print data has been completed.

24. The method of claim 21, the method further including inserting the second image controller command as having data representative of the request to send the status message to an accounting host indicating that a quantity of media has been interpreted by the image controller.

25. The method of claim 21, wherein before the steps of inserting the first and second image controller commands the method further comprises:

providing data representative of a network address of the user workstation in the first image controller command; and providing data representative of a network address other than the network address of the user workstation in the second image controller command.

26. The method of claim 21, the method further including inserting the second image controller command into the print job including data representative of the request for the status message to the network address indicating that the image controller has processed a portion of the print job including at least one specific command defined in a Page Description Language.

* * * * *